H. G. Taylor.
Square and Bevel.

N° 78,770.     Patented Jun. 9, 1868.

Witnesses.
Theo Insche
W<sup>m</sup> Trewin.

Inventor.
H. G. Taylor
Per Munn & Co.
Attorneys

United States Patent Office.

H. G. TAYLOR, OF PORT HOPE, CANADA WEST.

Letters Patent No. 78,770, dated June 9, 1868.

---

COMBINED SQUARE AND BEVEL.

---

*The Schedule referred to in these Letters Patent and making part of the same.*

---

TO ALL WHOM IT MAY CONCERN:

Be it known that I, H. G. TAYLOR, of Port Hope, in the Province of Canada West, have invented a new and improved Combination of Square and Bevel; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention consists in a new and improved combination of a square and bevel, whereby the blade may be set to any required angle or bevel, and, at the same time, a square be always preserved.

The invention differs very materially from an ordinary bevel, and also from all other combined bevels and squares which have come under my observation, as the square is always preserved under every adjustment of the device as a bevel.

In the accompanying sheet of drawings—

Figure 2:
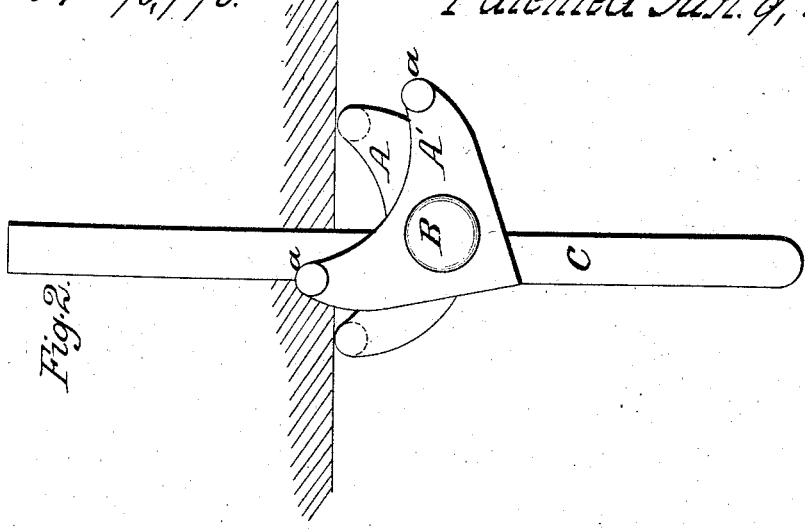
Figure 1:
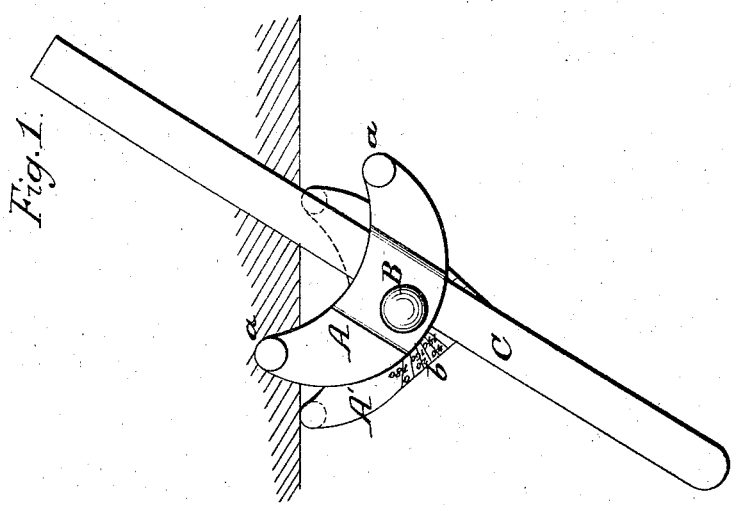

Figures 1 and 2 are side views of the invention.

The stock of the device is composed of two parts, A A', which, in this instance, are one, A, of crescent form, and the other, A', of trilateral form, with a curved or concave base, constructed of metal, and connected together, at their centre, by a screw and nut, B. These two parts have each pins, $a$, projecting from them at right angles, one at each end of their bases, and the part A has a recess in its under side, in which the blade C of the device is fitted, the blade being at right angles with the line of the pins $a$ of said part, and the inner surface of the blade flush with the inner surface of the part A, so that the two parts A A' may have their inner surfaces in contact.

The part A' is graduated, as shown at $b$, into the degrees of a part of a circle, and the bevel is obtained by lowering the nut of screw B, and adjusting the blade C to any angle required; and, in using the bevel, the pins $a\,a$ of the part A are placed in contact with the surface, with which the blade C forms the angle, and, when a square is required, the pins $a$ of the part A are placed against said surface, the device being inverted to effect that end.

Thus, it will be seen that a square and bevel are obtained by a very simple arrangement, the part A of the stock and the blade C comprising the square, the relative positions of which are never changed, and the part A' of the stock and the blade forming the bevel, the two parts A A' being prevented from casually moving by means of the screw and nut B.

Having thus described my invention, I claim as new, and desire to secure by Letters Patent—

A combined square and bevel, composed of a stock, formed of two parts, A A', connected by a screw and nut, B, and a blade, C, fitted between said parts, and connected with part A, all arranged substantially as shown and described.

H. G. TAYLOR.

Witnesses:
WM. GARNETT,
JNO. THOS. MONTGOMERY.